US012564890B2

(12) United States Patent
Jubeck et al.

(10) Patent No.: US 12,564,890 B2
(45) Date of Patent: Mar. 3, 2026

(54) JIGSAW

(71) Applicant: MILWAUKEE ELECTRIC TOOL CORPORATION, Brookfield, WI (US)

(72) Inventors: John M. Jubeck, Mequon, WI (US); Andrew J. Weber, Cudahy, WI (US); Jacob A. Edwards, Milwaukee, WI (US); Ryan D. Moorleghen, Milwaukee, WI (US); Matthew Leidel, Wind Lake, WI (US); Wu Fan, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 228 days.

(21) Appl. No.: 18/139,629

(22) Filed: Apr. 26, 2023

(65) Prior Publication Data

US 2023/0356310 A1 Nov. 9, 2023

Related U.S. Application Data

(60) Provisional application No. 63/384,475, filed on Nov. 21, 2022, provisional application No. 63/338,288, filed on May 4, 2022.

(51) Int. Cl.
*B23D 51/16* (2006.01)
*B23D 49/16* (2006.01)
*B23D 59/00* (2006.01)
(52) U.S. Cl.
CPC ............. *B23D 51/16* (2013.01); *B23D 49/16* (2013.01); *B23D 59/006* (2013.01)
(58) Field of Classification Search
CPC ....... B23D 51/16; B23D 49/16; B23D 59/006
See application file for complete search history.

(56) References Cited

U.S. PATENT DOCUMENTS

| | | | |
|---|---|---|---|
| 2,764,188 | A | 9/1956 | Hoffman |
| 2,781,800 | A | 2/1957 | Papworth |

(Continued)

FOREIGN PATENT DOCUMENTS

| | | |
|---|---|---|
| CN | 101786187 A | 7/2010 |
| CN | 103659746 A | 3/2014 |

(Continued)

OTHER PUBLICATIONS

Extended European Search Report for Application No. 23170602.9 dated Jan. 15, 2024 (13 pages).

(Continued)

*Primary Examiner* — Sean M Michalski
(74) *Attorney, Agent, or Firm* — Michael Best & Friedrich LLP

(57) ABSTRACT

A jigsaw including a housing, a handle extending transverse from the housing in a direction of a handle axis, a battery selectively coupled to the handle, a foot plate coupled to the housing and configured to contact a workpiece, and a drive assembly powered by the battery. The drive assembly includes a motor, a fan, a transmission driven by the motor, and an output spindle driven by the transmission and coupled to a cutting blade. The jigsaw also includes a frame supported within the housing which supports the motor and the transmission. The frame includes a shroud surrounding at least a portion of the fan and an air chute in fluid communication with the shroud that together direct an airflow produced by the fan toward a cutting area adjacent the cutting blade. The jigsaw also includes a baffle that is selectively moveable into the air chute to redirect the airflow away from the cutting blade.

10 Claims, 11 Drawing Sheets

(56) References Cited

U.S. PATENT DOCUMENTS

| | | | |
|---|---|---|---|
| 2,961,016 A | 11/1960 | Papworth | |
| 3,774,302 A * | 11/1973 | Ketchpel, Jr. | A01G 3/067 |
| | | | 30/247 |
| 3,841,416 A | 10/1974 | Pfister | |
| 3,903,657 A | 9/1975 | Pfister | |
| 4,628,605 A * | 12/1986 | Clowers | B23D 49/165 |
| | | | 30/393 |
| 5,012,583 A * | 5/1991 | Blochle | B23Q 11/0046 |
| | | | 30/392 |
| 5,946,810 A | 9/1999 | Hoelderlin et al. | |
| 6,047,477 A | 4/2000 | Di Nicolantonio | |
| 6,920,695 B2 | 7/2005 | Zeiter et al. | |
| 7,234,243 B2 | 6/2007 | Tam et al. | |
| 7,363,713 B2 | 4/2008 | Hirabayashi et al. | |
| 7,748,125 B2 | 7/2010 | Rakaczki | |
| 8,082,671 B2 | 12/2011 | Saegesser | |
| 8,112,895 B2 | 2/2012 | Rakaczki | |
| 8,201,337 B2 | 6/2012 | Tam et al. | |
| 8,407,902 B2 | 4/2013 | Naughton et al. | |
| 8,636,081 B2 | 1/2014 | Ludy et al. | |
| 8,656,598 B2 | 2/2014 | Kaiser et al. | |
| 8,732,963 B2 | 5/2014 | Sinner-Hettenbach et al. | |
| 9,009,982 B1 * | 4/2015 | Sedgwick | B23D 45/003 |
| | | | 30/388 |
| 9,038,278 B2 | 5/2015 | Kani et al. | |
| 9,061,411 B2 | 6/2015 | Naughton et al. | |
| 9,132,491 B2 | 9/2015 | Alberti et al. | |
| 9,221,112 B2 | 12/2015 | Kehoe et al. | |
| 9,233,427 B2 | 1/2016 | Alberti et al. | |
| 9,259,832 B2 | 2/2016 | Miyazawa et al. | |
| 9,289,890 B2 | 3/2016 | Ludy et al. | |
| 9,339,878 B2 | 5/2016 | Fuchs | |
| 9,358,624 B2 | 6/2016 | Bantle et al. | |
| 9,457,489 B2 | 10/2016 | Fuchs | |
| 9,486,866 B2 | 11/2016 | Winkler et al. | |
| 9,610,698 B2 | 4/2017 | Fuchs | |
| D791,565 S | 7/2017 | Hyma et al. | |
| 9,844,824 B2 | 12/2017 | Fuchs | |
| 9,919,409 B2 | 3/2018 | Schomisch et al. | |
| 10,160,048 B2 | 12/2018 | Weir et al. | |
| 10,354,823 B2 | 7/2019 | Nagy et al. | |
| 10,391,667 B2 | 8/2019 | Staeubli et al. | |
| 10,413,980 B2 | 9/2019 | Naughton et al. | |
| 10,486,326 B2 | 11/2019 | Fuchs | |
| 10,603,728 B2 | 3/2020 | Gall | |
| 10,661,364 B2 | 5/2020 | Laett | |
| 10,835,972 B2 | 11/2020 | Wyler | |
| 10,960,475 B2 | 3/2021 | Gall | |
| 11,097,442 B2 | 8/2021 | Staeubli et al. | |
| 11,765,998 B1 * | 9/2023 | Fu | B25F 5/02 |
| | | | 30/517 |
| 2003/0121161 A1 * | 7/2003 | Swift | B23D 49/105 |
| | | | 30/392 |
| 2007/0101586 A1 | 5/2007 | Felder et al. | |
| 2008/0244916 A1 | 10/2008 | Felder | |
| 2009/0000128 A1 | 1/2009 | Kaiser et al. | |

| | | | |
|---|---|---|---|
| 2010/0126328 A1 | 5/2010 | Grolimund | |
| 2010/0269353 A1 * | 10/2010 | Martin | B27B 9/02 |
| | | | 30/390 |
| 2012/0030955 A1 | 2/2012 | Kaiser et al. | |
| 2012/0192440 A1 | 8/2012 | Jerabek et al. | |
| 2013/0019483 A1 * | 1/2013 | Naughton | B23D 51/16 |
| | | | 30/376 |
| 2013/0097878 A1 * | 4/2013 | Naito | B23D 47/12 |
| | | | 30/340 |
| 2013/0133210 A1 | 5/2013 | Weir et al. | |
| 2014/0013917 A1 | 1/2014 | Meier | |
| 2014/0053417 A1 | 2/2014 | Fuchs | |
| 2018/0264566 A1 | 9/2018 | Smith | |
| 2019/0232402 A1 | 8/2019 | Wekwert et al. | |
| 2020/0398355 A1 | 12/2020 | Mougeotte et al. | |
| 2022/0134452 A1 * | 5/2022 | Ukai | B23D 51/16 |
| | | | 30/392 |
| 2023/0109320 A1 * | 4/2023 | Hachisuka | B27C 5/10 |
| | | | 30/277.4 |

FOREIGN PATENT DOCUMENTS

| | | | |
|---|---|---|---|
| CN | 101722334 B | 7/2015 | |
| CN | 205111786 U | 3/2016 | |
| CN | 102528160 B | 6/2016 | |
| CN | 104096910 B | 10/2017 | |
| CN | 104708109 B | 6/2019 | |
| CN | 111097963 A | 5/2020 | |
| CN | 106270770 B | 12/2020 | |
| CN | 212976951 U | 4/2021 | |
| DE | 7017396 U | 11/1971 | |
| DE | 3717585 A1 | 12/1988 | |
| DE | 102008055055 A1 | 7/2010 | |
| DE | 102011076253 A1 | 11/2012 | |
| DE | 10214454 B4 | 4/2013 | |
| DE | 202014005376 U1 | 7/2014 | |
| DE | 102019214971 A1 | 4/2021 | |
| EP | 3000563 A1 | 3/2016 | |
| JP | S6110801 U | 1/1986 | |
| WO | 2004054746 A1 | 7/2004 | |
| WO | 2009074382 A1 | 6/2009 | |
| WO | 2009086971 A1 | 7/2009 | |
| WO | 2011018276 A1 | 2/2011 | |
| WO | 2011072436 A1 | 6/2011 | |
| WO | 2012116837 A1 | 9/2012 | |
| WO | 2012135608 A1 | 10/2012 | |
| WO | 2012167975 A1 | 12/2012 | |
| WO | 2014001124 A1 | 1/2014 | |
| WO | 2014159674 A1 | 10/2014 | |
| WO | 2019211133 A1 | 11/2019 | |
| WO | 2020087502 A1 | 5/2020 | |

OTHER PUBLICATIONS

Partial European Search Report for Application No. 23170602.9 dated Oct. 12, 2023 (17 pages).

* cited by examiner

JIGSAW

CROSS-REFERENCE TO RELATED APPLICATION

This application claims priority U.S. Provisional Patent Application No. 63/384,475, filed Nov. 21, 2022, and U.S. Provisional Patent Application No. 63/338,288, filed May 4, 2022, the entire contents of both of which are incorporated by reference herein.

FIELD OF THE INVENTION

The present invention relates to power tools, and more specifically to jigsaws.

BACKGROUND OF THE INVENTION

Various power tools, such as jigsaws, create dust and debris during a cutting operation. Not only can dust and debris be hazardous at some workstations, but dust and debris can accumulate on the workpiece itself making it difficult to view the workpiece during the cutting operation.

SUMMARY OF THE INVENTION

The present invention provides, in one aspect, a jigsaw including a housing, a handle extending substantially transverse from the housing in a direction of a handle axis, a battery selectively coupled to the handle, a foot plate coupled to the housing and configured to contact a workpiece during a cutting operation, and a drive assembly powered by the battery. The drive assembly includes a motor, a fan, a transmission driven by the motor, and an output spindle driven by the transmission in a reciprocating manner and coupled to a cutting blade. The jigsaw further includes a frame supported within the housing which, in turn, supports the motor and the transmission. The frame includes a shroud surrounding at least a portion of the fan and an air chute in fluid communication with the shroud that together direct an airflow produced by the fan toward a cutting area adjacent the cutting blade. The jigsaw further includes a baffle that is selectively moveable into the air chute to redirect the airflow away from the cutting blade.

The present invention provides, in another aspect, a jigsaw including a housing, a handle extending substantially transverse from the housing in a direction of a handle axis, a battery selectively coupled to the handle, a foot plate coupled to the housing and configured to contact a workpiece during a cutting operation, and a drive assembly powered by the battery. The drive assembly includes a motor, a transmission driven by the motor, an output spindle driven by the transmission and coupled to a cutting blade, and a scotch yoke mechanism to convert a rotational motion of the transmission to a reciprocating motion of the output spindle and the cutting blade within a blade plane. The jigsaw further includes a support block that is coupled to the housing and receives the output spindle. The output spindle slides along the support block as the support block inhibits the output spindle from moving in a direction transverse to the blade plane.

The present invention provides, in yet another aspect, a jigsaw including a housing, a handle extending substantially transverse from the housing in a direction of a handle axis, a battery selectively coupled to the handle, a foot plate coupled to the housing and configured to contact a workpiece during a cutting operation, and a drive assembly powered by the battery. The drive assembly includes a motor supported within the housing via a plurality of ribs, a transmission driven by the motor, and an output spindle driven by the transmission and coupled to a cutting blade. The jigsaw further includes an activation switch that is slidable along a switch axis that is parallel to the handle axis between an activated state, in which the drive assembly is activated, and a deactivated state, in which the drive assembly is deactivated. A linkage is directly coupled to and moveable with the activation switch. The linkage is configured to interact with a limit switch. The linkage slides through at least one of the ribs when the activation switch is moved between the activated state and the deactivated state.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
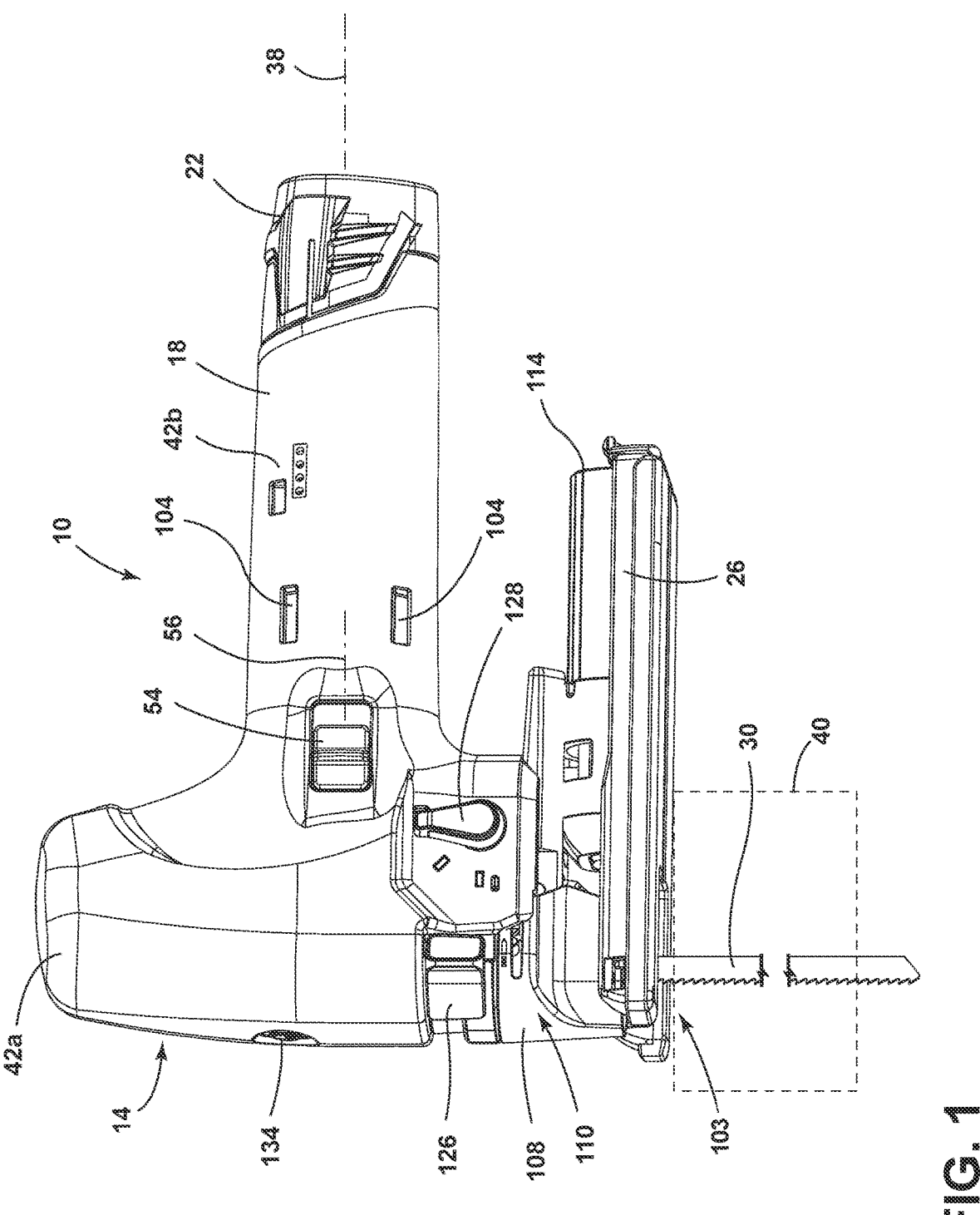
FIG. 1 is perspective view of a jigsaw in accordance with an embodiment of the invention.

FIG. 1 illustrates a power tool, such as a jigsaw 10, including a housing 14, a handle 18 extending from the housing 14 in a generally transverse direction, a battery 22 removably coupled to the handle 18, a foot plate 26 pivotably coupled to the housing 14 and configured to contact a workpiece during a cutting operation, and a cutting blade 30 protruding from the housing 14 and the lower surface of the foot plate 26. The jigsaw 10 includes a drive assembly 34 (FIG. 2) powered by the battery 22 and operable to impart reciprocating motion to the cutting blade 30 for cutting of a workpiece. The jigsaw 10 defines a handle axis 38 extending in the direction of the handle 18. Moreover, the cutting blade 30 generally reciprocates within a blade plane 40 during a cutting operation.

Figure 2:
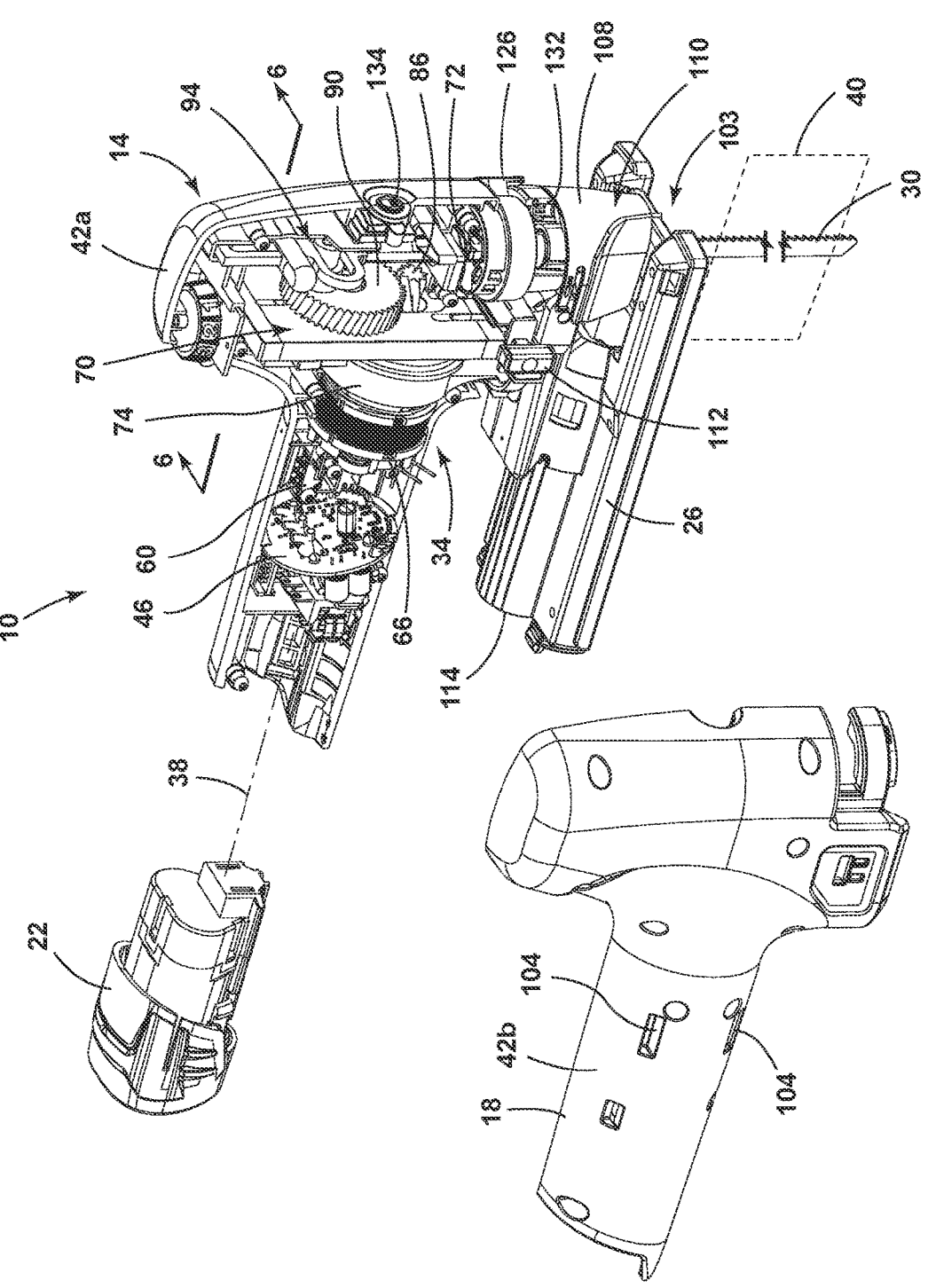
FIG. 2 is a partially exploded perspective view of the jigsaw of FIG. 1.

With reference to FIGS. 1 and 2, the handle 18 receives the battery 22 along the handle axis 38 and supports a controller 46. The controller 46 is disposed between the battery 22 and the drive assembly 34 in a direction along the handle axis 38. The jigsaw 10 also includes gripping surfaces 42a, 42b disposed on the housing 14 and the handle 18, respectively, that are graspable by a user to operate and maneuver the jigsaw 10 relative to a workpiece. The gripping surfaces 42a, 42b, in addition to the housing 14 and the handle 18, are composed of a non-conductive material (e.g., plastic with or without an elastomeric overmold). Such a non-conductive material electrically insulates the user should the user inadvertently cut an electrical wire during a cutting operation, thus inhibiting, or at least mitigating, an electrical shock.

Figure 3:
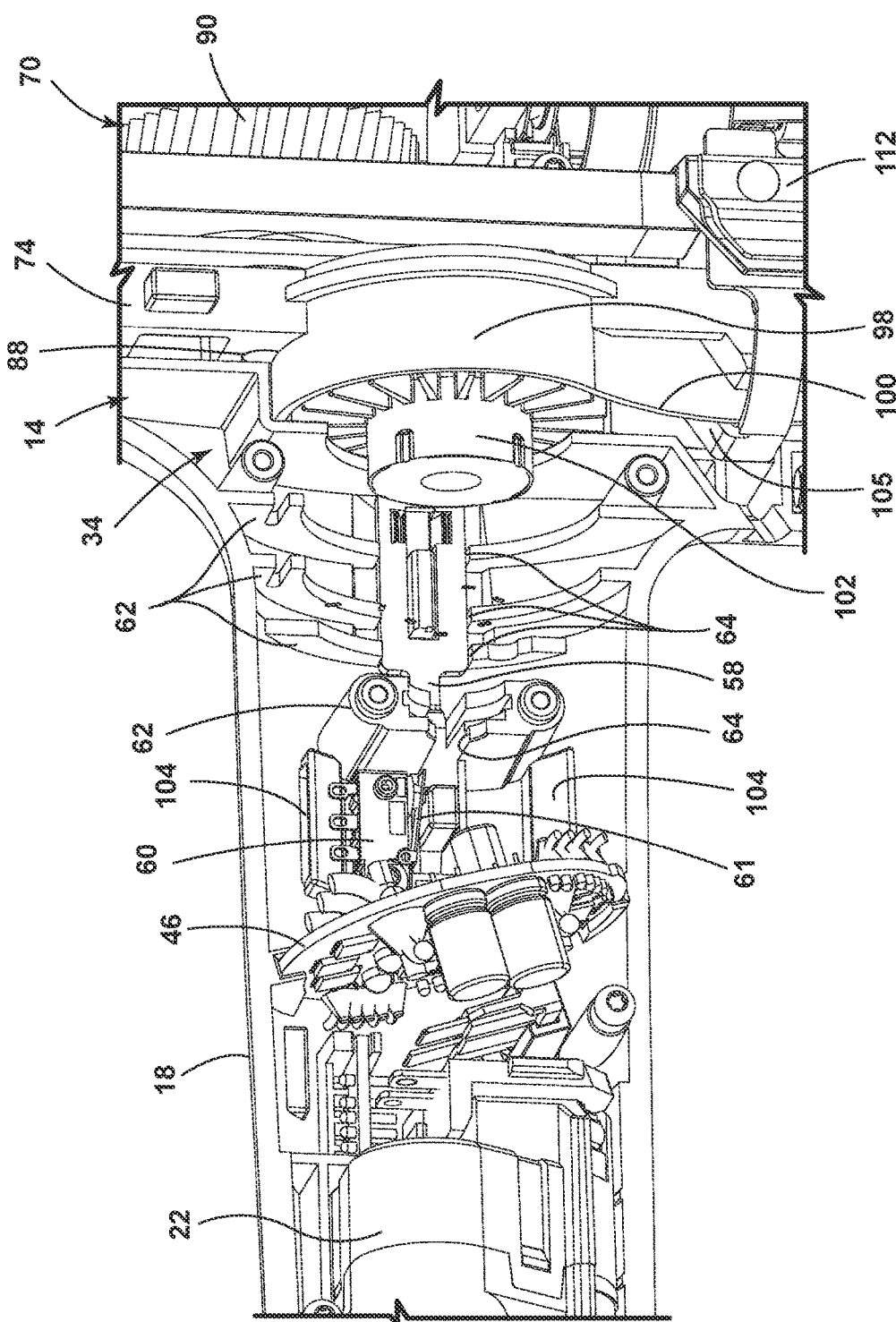
FIG. 3 is an enlarged perspective view of the jigsaw of FIG. 1, with a portion of the housing removed.

With reference to FIGS. 1-3, the jigsaw 10 further includes an activation switch 54 in electrical communication with the controller 46 to selectively supply power to the drive assembly 34. Specifically, the activation switch 54 provides an input to the controller 46 which, in turn, instructs the battery 22 to supply power to the drive assembly 34. The activation switch 54 is provided adjacent the handle 18 and disposed radially outward from a brushless direct current (DC) electric motor 66, which is a component of the drive assembly 34 (FIG. 2). The activation switch 54 is slidable between an activated state, in which the battery 22 supplies power to the drive assembly 34, and a deactivated state, in which the drive assembly 34 is deactivated. The activation switch 54 is slidable along a switch axis 56 that is parallel to the handle axis 38 of the jigsaw 10 (FIG. 1). The activation switch 54 is coupled to a linkage 58 that is disposed on the interior of the housing 14 and is moveable with the activation switch 54 (FIG. 3). The linkage 58 is parallel to the handle axis 38 as well. The linkage 58 is configured to interact with a limit switch 60 that is disposed rearward of the motor 66 and selectively depress an arm 61 of the limit switch 60 for activating the motor 66. The limit switch 60 is in electrical communication with the controller 46. The linkage 58 is also disposed radially outward from the motor 66 relative to the handle axis 38. In order for the activation switch 54 and the linkage 58 to be disposed radially outward from the motor 66, the linkage 58 extends through a plurality of ribs 62 on the interior of the housing 14 that support the motor 66 in the housing 14. As such, the linkage 58 slides through aligned slots 64 in the ribs 62 as the linkage 58 engages and disengages the limit switch 60 during the activated state and the deactivated state, respectively.

Figure 4:
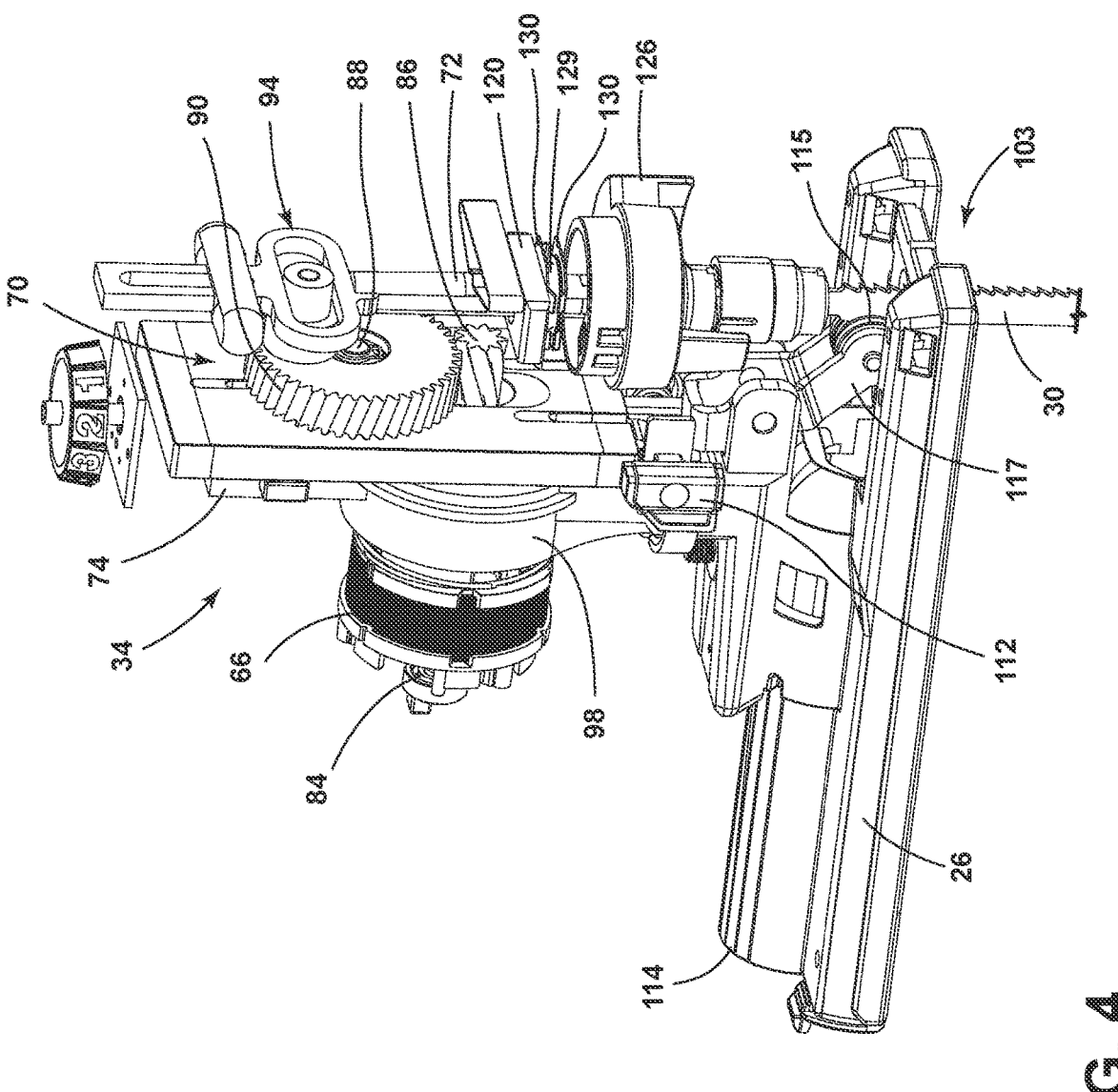
FIG. 4 is a perspective view of a portion of a drive assembly of the jigsaw of FIG. 1, illustrating a motor, a transmission, and a frame supporting the motor and transmission.
Figure 5:
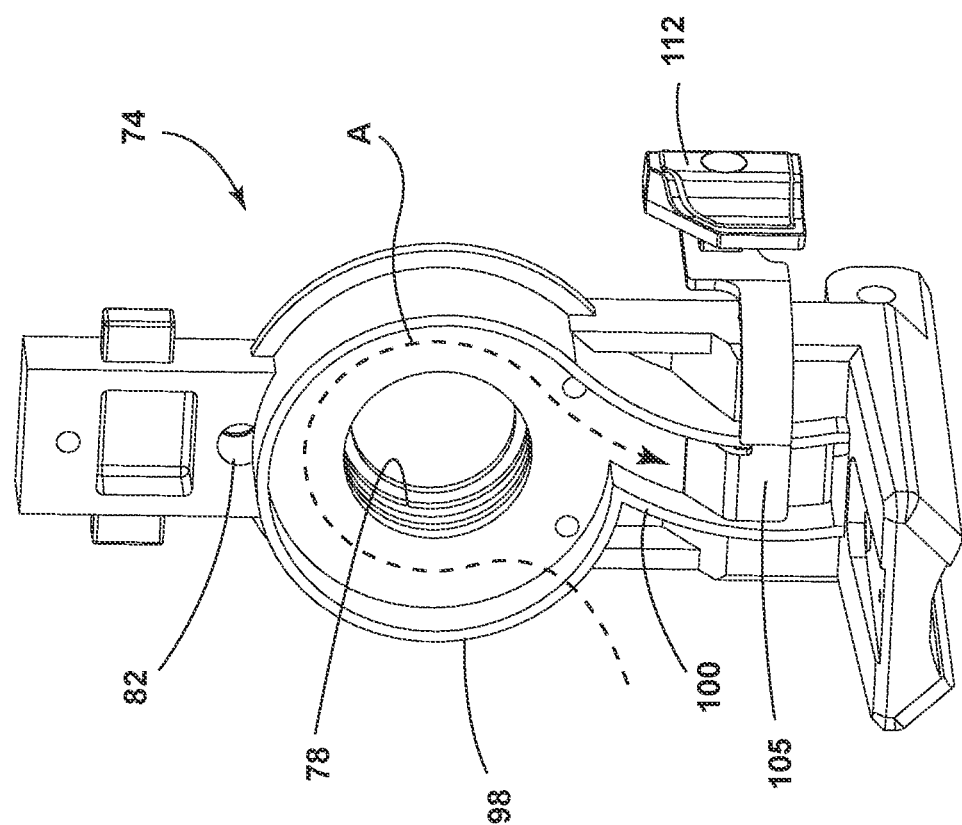
FIG. 5 is a perspective view of the frame of the drive assembly of FIG. 4.

With reference to FIGS. 4 and 5, the drive assembly 34 of the jigsaw 10 is disposed within the housing 14 and the handle 18. The drive assembly 34 includes the motor 66, a transmission 70 driven by the motor 66, an output spindle 72 to which the cutting blade 30 is removably secured, and a scotch yoke mechanism 94 that transfers the rotational motion of the transmission 70 to a reciprocating motion of the output spindle 72. A frame 74 is disposed within the housing 14 and supports the motor 66 and the transmission 70 within the housing 14. The frame 74 is composed of a non-conductive material (e.g., plastic) like the housing 14 and the handle 18. Such a non-conductive material electrically insulates the user should the user inadvertently cut an electrical wire during a cutting operation, thus inhibiting, or at least mitigating, an electrical shock. As shown in FIG. 5, the frame 74 includes two apertures 78, 82 that support the motor 66 and the transmission 70, respectively. The aperture 78 receives and supports a drive shaft 84 of the motor 66 which, in turn, supports a helical drive gear 86 (FIG. 4). The aperture 82 receives and supports a driven shaft 88 of a helical driven gear 90 of the transmission 70. The helical drive gear 86 intermeshes and drives the helical driven gear 90 of the transmission 70. Due to the rotational motion of the transmission 70 being converted to the reciprocating motion of the output spindle 72 via the scotch yoke mechanism 94, the cutting blade 30 is also driven in a reciprocating manner.

With reference to FIG. 5, the frame 74 also includes a shroud 98 and an air chute 100 that is in fluid communication with the shroud 98. The shroud 98, the air chute 100, and a fan 102 disposed within the shroud 98 (FIG. 3) and coupled to the drive shaft 84 of the motor 66 cooperate to direct an airflow A from the fan 102 toward a cutting area 103 adjacent to the cutting blade 30 and the foot plate 26. Specifically, the fan 102, when driven by the motor 66, creates a low-pressure zone within the housing 14, thereby drawing the airflow A through a plurality of intake vents 104 in the housing 14 (FIGS. 1 and 2) and through the motor 66. The airflow A is then circulated through the shroud 98 via the fan 102 and radially discharged through the air chute 100. A baffle 105 is movably disposed within the air chute 100 between a closed position and an open position. In the closed position (FIG. 6), the baffle 105 is disposed within the air chute 100, such that the airflow A is redirected from the air chute 100 and discharged through an air discharge port 106 of the housing 14 away from the cutting blade 30. In the open position (FIG. 7), the baffle 105 is removed from the air chute 100, such that the airflow A continues through the air chute 100 and toward the cutting blade 30. The baffle 105 translates between the open and closed positions via manual actuation of a blower switch 112 (FIGS. 2 and 5). The blower switch 112 is directly coupled to the baffle 105 and moves along a direction parallel to the handle axis 38. The baffle 105 also moves between the open and closed position along a direction parallel to the handle axis 38.

Figure 10:
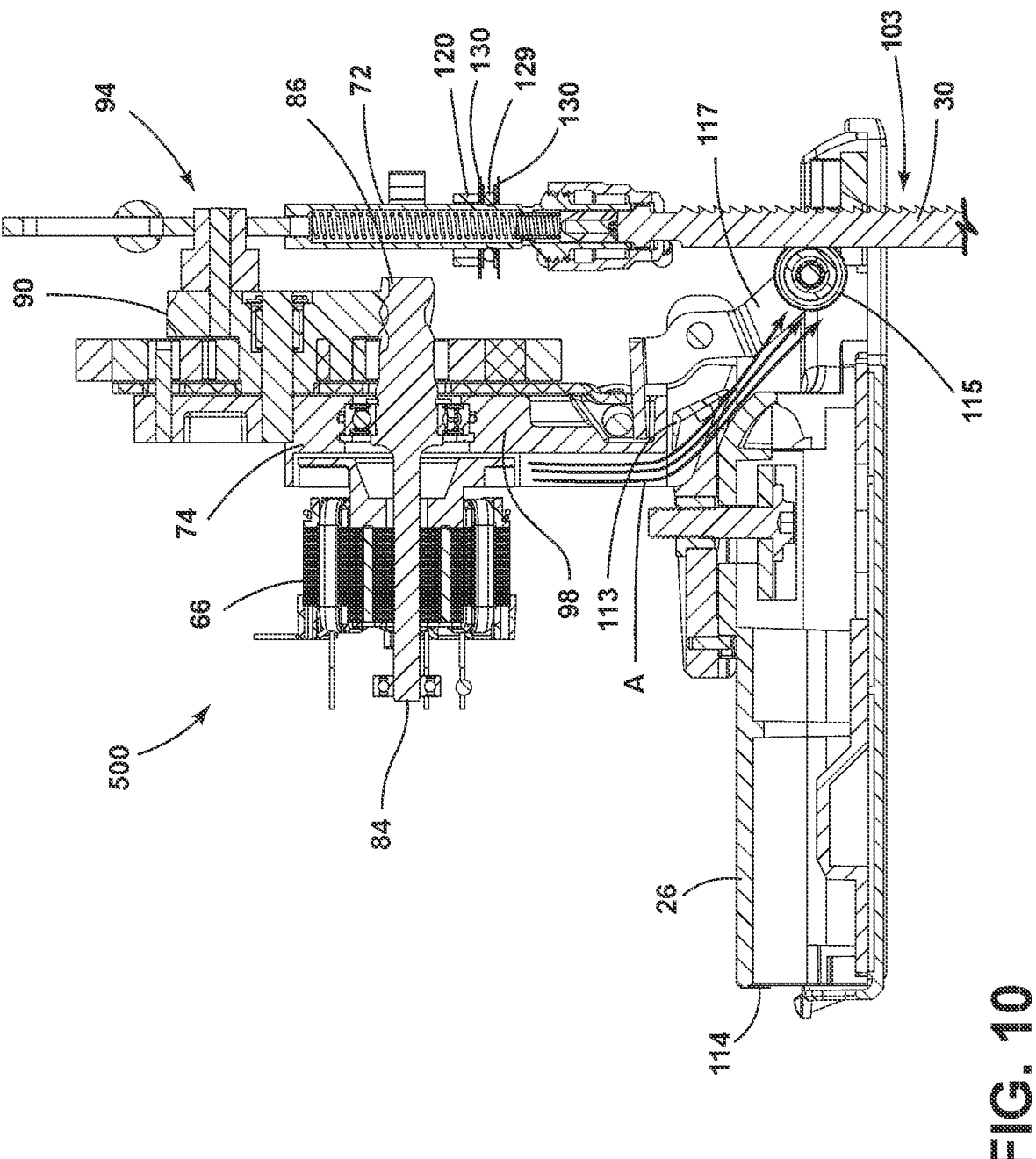
FIG. 10 is a jigsaw, with portions removed, in accordance with another embodiment of the invention.
Figure 11:
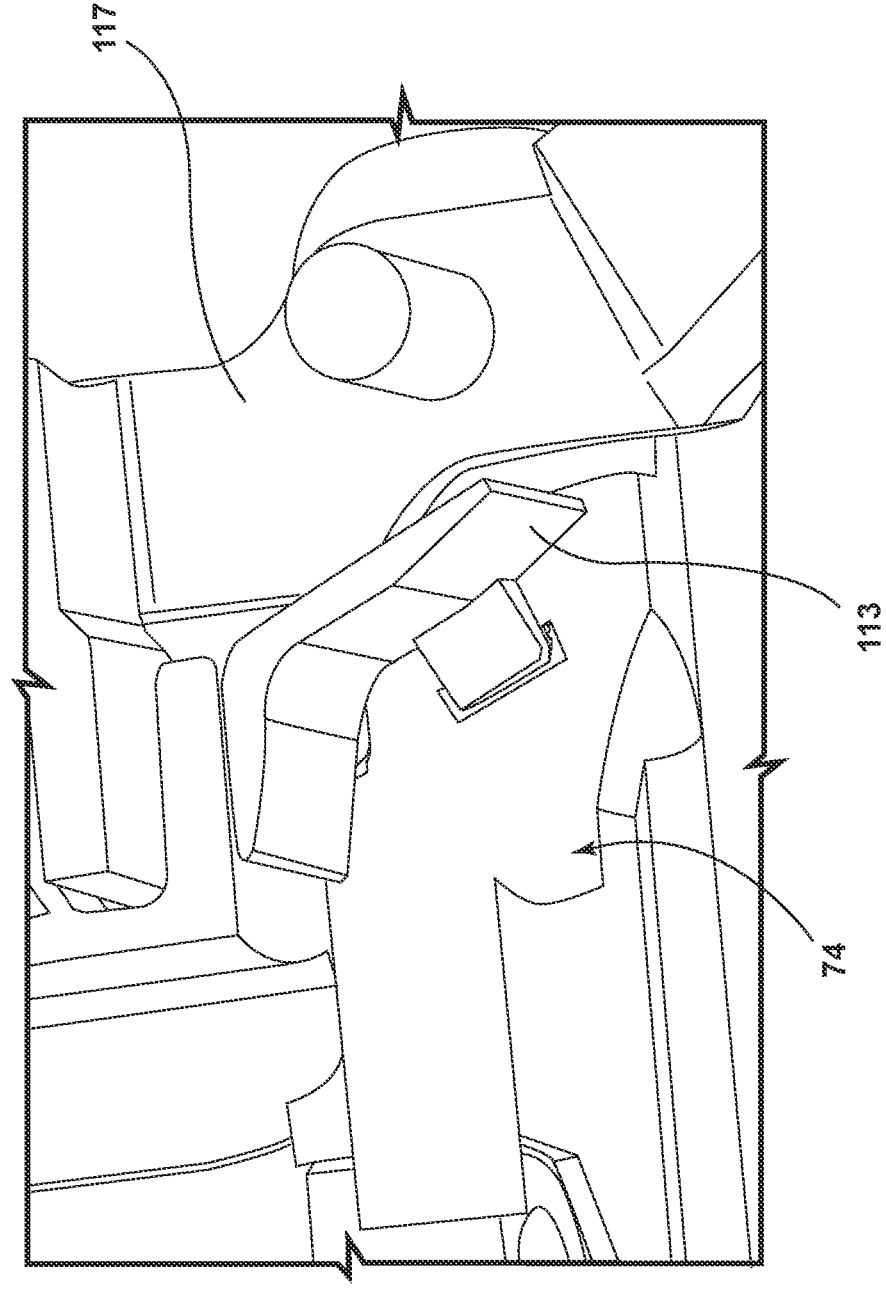
FIG. 11 is an enlarged perspective view of the jigsaw of FIG. 10, illustrating an air guide coupled to the frame.

FIG. 10 illustrates another embodiment of a jigsaw 500 (with like reference numerals being used for like features as the jigsaw 10) further including an air guide 113 coupled to the frame 74 to redirect the airflow A downward and towards a roller 115 supporting the cutting blade 30. The roller 115 is supported upon a linkage 117 operable to selectively impart an orbit motion to the cutting blade 30 during a return (i.e., cutting) stroke of the cutting blade 30. As a result, the airflow A is directed past the cutting blade 30 and in close proximity to the underlying workpiece being cut, effectively clearing dust and debris away from the cutting blade 30 and the region on the workpiece being cut. As shown in FIG. 11, the air guide 113 is coupled to the frame 74 by a snap-fit mechanism. However, in other embodiments, the air guide 113 may be fastened to the frame 74 or integrally formed therewith.

Figure 12:
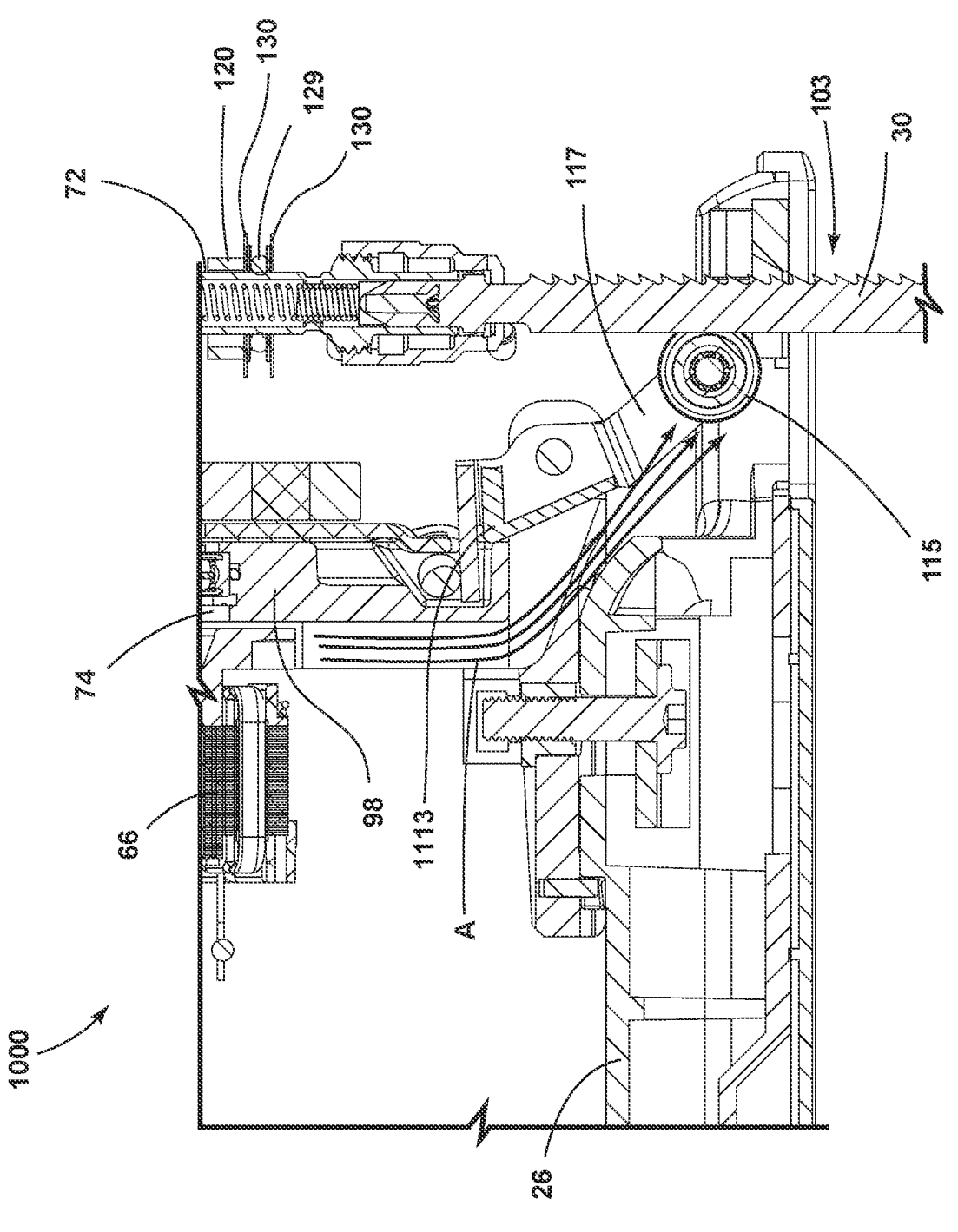
FIG. 12 is an enlarged plan view of a jigsaw in accordance with yet another embodiment of the invention.

FIG. 12 illustrates another embodiment of a jigsaw 1000 (with like reference numerals being used for like features as the jigsaw 10) including an air guide 1113 that is integrally formed as a single piece with the linkage 117 (FIG. 12). Like the air guide 113, the air guide 1113 is operable to direct the airflow A past the cutting blade 30 and in close proximity to the underlying workpiece being cut, effectively clearing dust and debris away from the cutting blade 30 and the region on the workpiece being cut.

Figure 7:
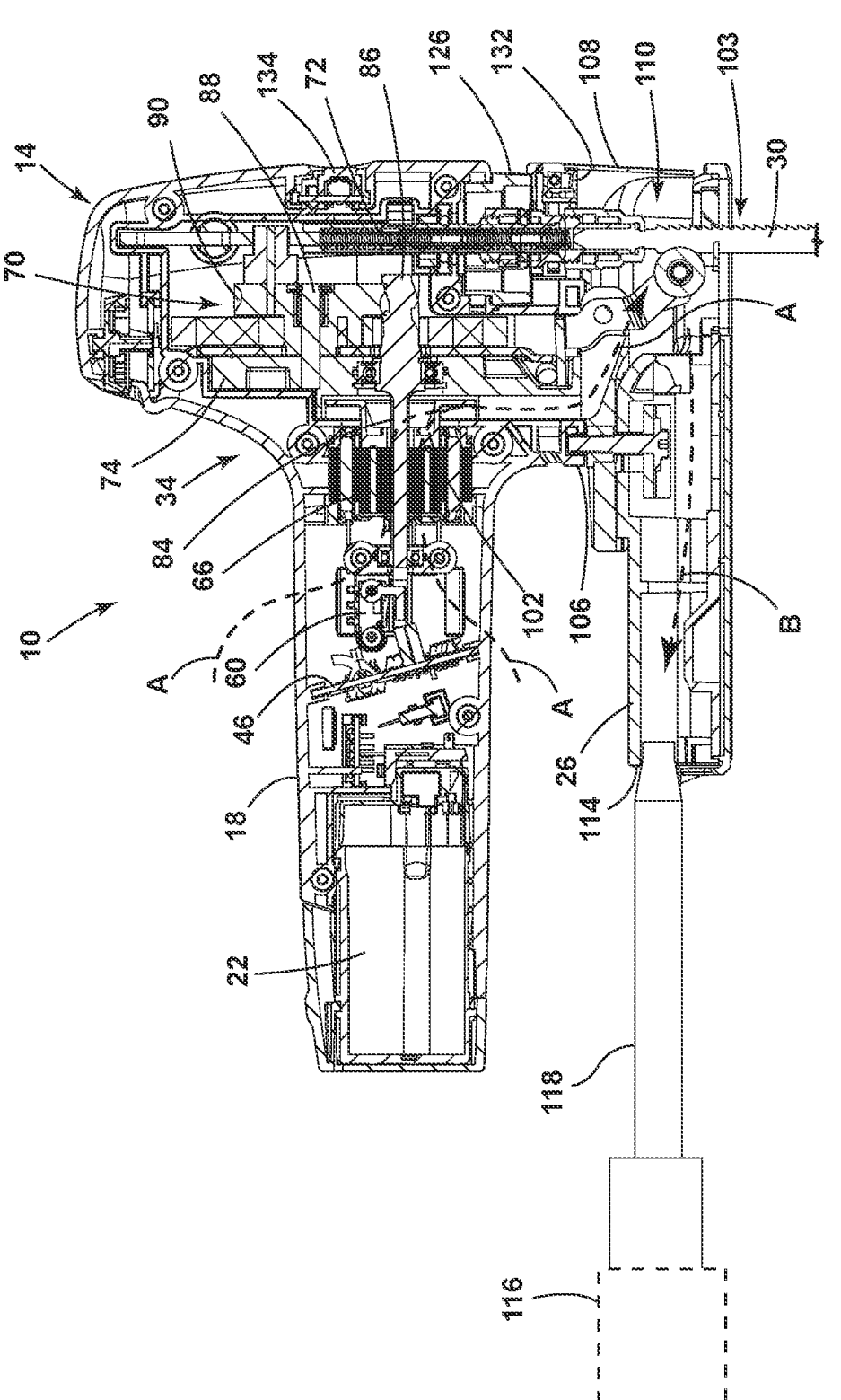
FIG. 7 is another cross-sectional view of the jigsaw of FIG. 6, illustrating the baffle in an open position.

The jigsaw 10 further includes a dust shield 108 (FIG. 1) that is removably coupled between the housing 14 and the foot plate 26. A debris chamber 110 is created when the dust shield 108 is coupled to the housing 14, which is defined as the enclosed space immediately surrounding the cutting blade 30 by at least portions of the housing 14, the foot plate 26, and the dust shield 108. When the baffle 105 is in the open position and the dust shield 108 is coupled to the housing 14 (as shown in FIG. 7), the airflow A is directed to the debris chamber 110. Now, the dust shield 108 inhibits dust and debris from leaving the debris chamber 110, at which point a vacuum source 116 (as also shown in FIG. 7) may draw the dust and debris from the debris chamber 110.

Figure 6:
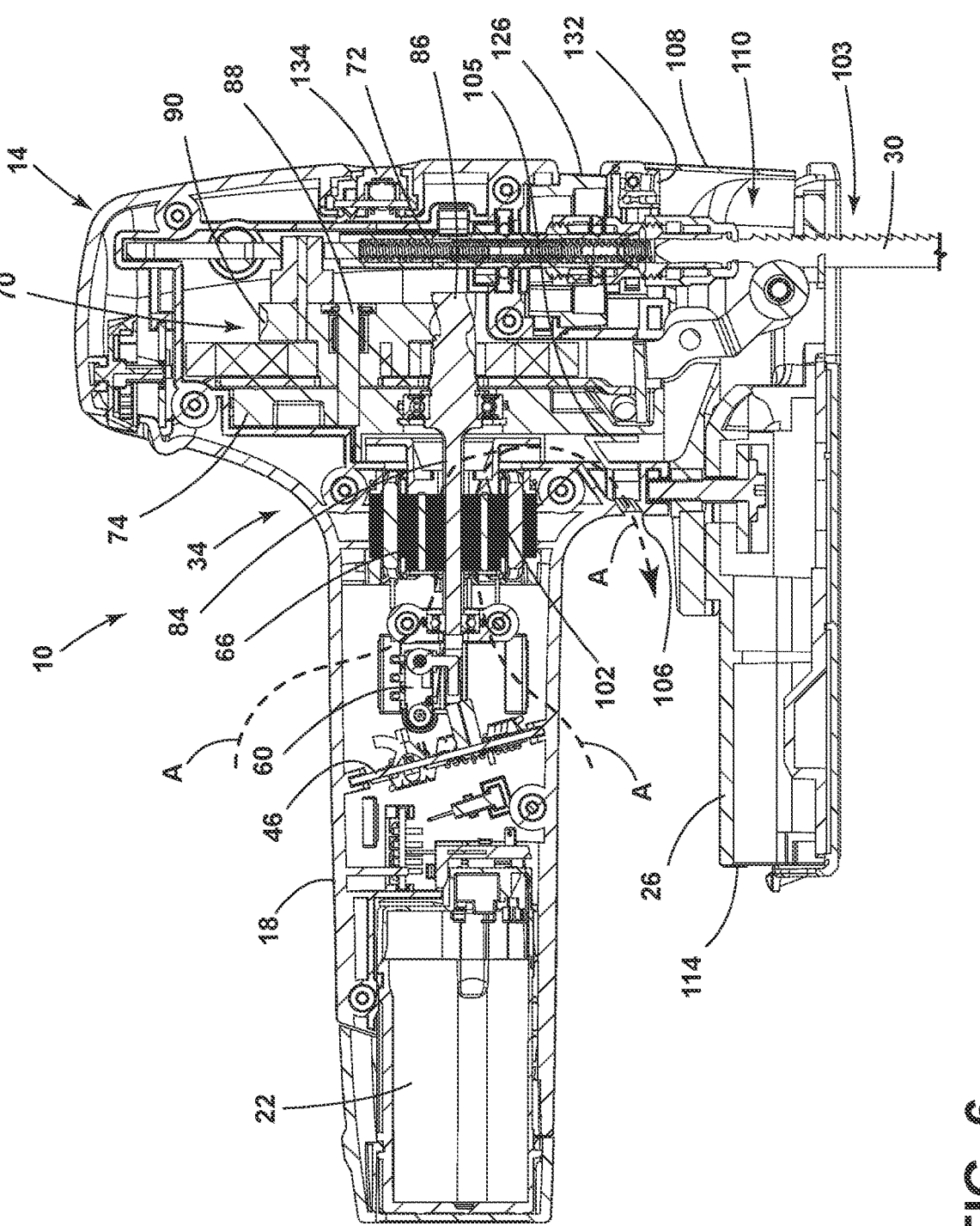
FIG. 6 is a cross-sectional view of the jigsaw taken along line 6-6 of FIG. 2, illustrating a baffle in a closed position.

With reference to FIGS. 6 and 7, the debris chamber 110 is in fluid communication with a passageway 114 extending through the foot plate 26, which is ultimately in fluid communication with the vacuum source 116 via a vacuum adapter 118 coupled to the passageway 114. The vacuum source 116 generates a low-pressure zone within the debris chamber 110 to draw dust and debris out of the debris chamber 110 along an airflow B. Specifically, dust and debris within the debris chamber 110 travel through the passageway 114 and the vacuum adapter 118 before reaching the vacuum source 116. When the vacuum source 116 is activated, the baffle 105 may be positioned in the closed position to prevent the airflow A from merging with the airflow B. The dust shield 108 is composed of a transparent material, so that a user can view the cutting blade 30 and the workpiece during a cutting operation. Containing dust and debris within the debris chamber 110 and extracting it therefrom helps to maintain a clean workstation and provides a clear view of the workpiece. In a situation where the dust shield 108 is not coupled to the housing 14, the airflow A is exhausted to create a high-pressure zone adjacent the cutting blade 30, where the airflow A disperses dust and debris away from the cutting blade 30. This ensures a user has a clear view of a workpiece during a cutting operation. In another situation where the dust shield 108 is not coupled to the housing 14, the vacuum 116 can generate the low-pressure zone within the cutting area 103 adjacent the cutting blade 30 to draw dust and debris out of the cutting area 103 along the airflow B.

Figures 8, 9:
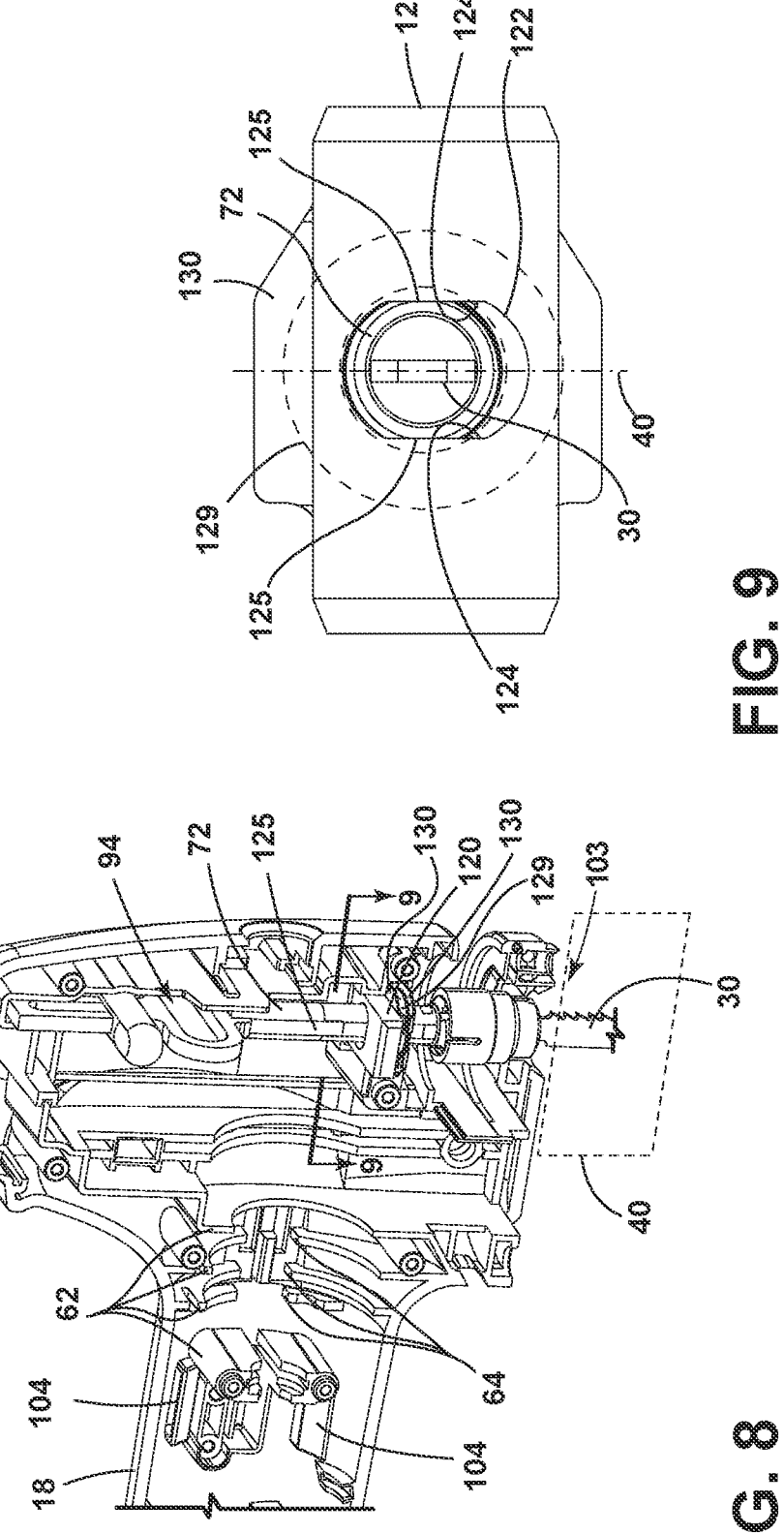
FIG. 8 is a perspective view of a portion of the drive assembly of the jigsaw of FIG. 1.
FIG. 9 is a cross-sectional view of a portion of the drive assembly taken along line 9-9 of FIG. 8.

With reference to FIGS. 8 and 9, the drive assembly 34 is configured in a manner to increase cutting accuracy during a cutting operation. Specifically, the output spindle 72 is supported within the housing 14 via a support block 120, as shown in FIG. 8. An elongated aperture 122 (FIG. 9) of the support block 120 receives the output spindle 72 and helps maintain alignment of the output spindle 72 within the blade plane 40 as the output spindle 72 reciprocates. More specifically, the support block 120 mechanically interferes with the output spindle 72 in a direction transverse to the blade plane 40 to maintain alignment of the output spindle 72 with the blade plane 40. The elongated aperture 122 includes a pair of flat inner wall surfaces 124 that abut a pair of corresponding flat outer wall surfaces 125 of the output spindle 72 to inhibit the output spindle 72 from oscillating out of the blade plane 40. When the output spindle 72 reciprocates, the flat outer wall surfaces 125 of the output spindle 72 slide against the flat inner wall surfaces 124 of the support block 120. Effectively, the blade plane 40 bisects the output spindle 72 (as shown in FIG. 9), and the elongated aperture 122 cooperates with the output spindle 72 to maintain the blade plane 40 alignment along a centerline of the output spindle 72. The elongated aperture 122 does, however, enable the output spindle 72 to reciprocate through a length of the elongated aperture 122 when the jigsaw 10 is in an orbital cutting mode rather than a straight cutting mode.

The jigsaw 10 includes a mode selector switch 128 (FIG. 1) that allows a user to switch the jigsaw 10 between the orbital cutting mode and the straight cutting mode.

With reference to FIG. 1, the jigsaw 10 further includes a quick-disconnect mechanism or a blade ejection mechanism 126 disposed on the housing 14. The blade ejection mechanism 126 is pivotable about output spindle 72 and is configured to selectively lock the cutting blade 30 to the output spindle 72. Specifically, the blade ejection mechanism 126 is pivotable from a locked position, in which the cutting blade 30 is inhibited from being removed from the output spindle 72, and an unlocked position, in which the cutting blade 30 is permitted to be removed from the output spindle 72. FIG. 1 illustrates the blade ejection mechanism 126 is biased toward the locked position. An O-ring 129 is disposed between sealing plates 130 of the output spindle 72 (FIG. 4). Furthermore, the O-ring 129 is fit snuggly around the output spindle 72 to inhibit dust and debris from inadvertently entering the housing 14 through the blade ejection mechanism 126.

With reference to FIGS. 2 and 6, the jigsaw 10 further includes a work light 132 that is automatically turned on when the activation switch 54 is actuated to activate the motor 66. A work light button 134 is provided on the housing 14 to optionally deactivate the work light 132 such that actuating the activation switch 54 no longer automatically turns on the work light 132. A user may desire to deactivate the work light 132 via the work light button 134, for example, when a user is performing an inverted cutting operation so the work light 132 does not shine in the eyes of a user.

During operation, a user may grasp the gripping surfaces 42a, 42b of the housing 14 and the handle 18 to maneuver the jigsaw 10 relative to a workpiece. The user may rest the jigsaw 10 on the workpiece via the foot plate 26 and align the cutting blade 30 with the desired cut. The cutting blade 30 reciprocates within the blade plane 40 in response to the user sliding the activation switch 54 into the activated state. Specifically, the user slides the activation switch 54 along the switch axis 56 from the non-activated state to the activated state, causing the motor 66 to drive the transmission 70 and reciprocate the cutting blade 30. At this point, the work light 132 automatically illuminates the workpiece unless the work light button 134 has been depressed. The fan 102 rotates with the motor 66, thereby generating the airflow A that travels into the housing 14 via the plurality of vents 104, and through the motor 66, the shroud 98, and the air chute 100. If the blower switch 112 holds the baffle 105 in the open position, then the airflow A continues through the air chute 100 toward the cutting blade 30. If the blower switch 112 holds the baffle 105 in the closed position, then the airflow A is discharged from the housing 14 via the air discharge port 106.

Although the invention has been described in detail with reference to certain preferred embodiments, variations and modifications exist within the scope and spirit of one or more independent aspects of the invention as described.

What is claimed is:

1. A jigsaw comprising:

a housing;

a handle extending substantially transverse from the housing in a direction of a handle axis;

a battery selectively coupled to the handle;

a foot plate coupled to the housing and configured to contact a workpiece during a cutting operation;

a drive assembly powered by the battery, the drive assembly including a motor, a fan, a transmission driven by the motor, and an output spindle driven by the transmission in a reciprocating manner and coupled to a cutting blade;

a frame supported within the housing, the frame includes two apertures which, in turn, support the motor and the transmission, the frame further includes a shroud surrounding at least a portion of the fan and an air chute in fluid communication with the shroud that together direct an airflow produced by the fan toward the cutting blade; and a baffle that is selectively moveable into the air chute to redirect the airflow away from the cutting blade.

2. The jigsaw of claim 1, further comprising a dust shield that is removably coupled to the housing for creating a debris chamber, wherein the debris chamber is enclosed by at least portions of the housing, the foot plate, and the dust shield.

3. The jigsaw of claim 2, wherein the foot plate includes a passageway configured to be coupled to a vacuum source, such that the vacuum source may draw dust and debris from the debris chamber via the passageway in the foot plate.

4. The jigsaw of claim 1, wherein the fan creates a low-pressure zone within the housing, which draws the airflow through at least one vent in the housing, the motor, and the fan, and wherein the fan creates a high-pressure zone adjacent the cutting blade to disperse dust and debris away from the cutting blade.

5. The jigsaw of claim 1, wherein the baffle is moveable between an open position, in which the airflow is permitted to travel through the air chute and toward the cutting blade, and a closed position, in which the baffle inhibits the airflow from traveling toward the cutting blade and instead redirects the airflow out of the housing away from the cutting blade.

6. The jigsaw of claim 5, further comprising a switch coupled to the baffle, wherein manual actuation of the switch moves the baffle between the open position and the closed position.

7. The jigsaw of claim 1, further comprising an air guide disposed between the air chute and the cutting blade, wherein the air guide is configured to direct the airflow towards the cutting blade.

8. The jigsaw of claim 7, wherein the air guide is removably coupled to the frame.

9. The jigsaw of claim 7, wherein the air guide is integrally formed with the frame.

10. The jigsaw of claim 7, further comprising a linkage operable to selectively impart an orbit motion to the cutting blade, wherein the air guide is integrally formed with the linkage.

* * * * *